United States Patent [19]

Carbonnel et al.

[11] 3,999,998
[45] Dec. 28, 1976

[54] ISOTROPIC COMPOSITE CERAMIC WITH DISPERSED FIBERS AND PROCESS FOR MANUFACTURE THEREOF

[75] Inventors: Henri Carbonnel, Antony; Michel Marchais, Chatillon, both of France

[73] Assignee: Groupement pour les Activities Atomiques et Advancees "GAAA", Le Plessis Robinson, France

[22] Filed: Feb. 18, 1975

[21] Appl. No.: 550,506

Related U.S. Application Data

[63] Continuation of Ser. No. 408,129, Oct. 16, 1973, abandoned.

[30] Foreign Application Priority Data

Oct. 24, 1972  France ............................ 72.37680

[52] U.S. Cl. .................................. 106/64; 106/104
[51] Int. Cl.² ........................................ C04B 35/02
[58] Field of Search ...................... 106/64, 104, 99

[56] References Cited

UNITED STATES PATENTS

| 2,793,128 | 5/1957 | Emhiser | 106/64 |
| 3,253,936 | 5/1966 | Weindel | 106/64 |
| 3,269,849 | 8/1966 | Caprio et al. | 106/64 |
| 3,294,562 | 12/1966 | Caprio et al. | 106/64 |

*Primary Examiner*—J. Poer
*Attorney, Agent, or Firm*—Sughrue, Rothwell, Mion, Zinn & Macpeak

[57] ABSTRACT

Compound isotropic ceramic substance having ceramic fibers dispersed in a proportion greater than 20% by weight of the total weight of the final product, having excellent resistance to thermal shocks. The ceramic substance is constituted by ceramic fibers with calcium aluminate fulfilling the function of a hydraulic binding agent. The dispersing of the fibers in the binding agent may be obtained either in contact with a weight of water of the order of the weight of solid ingredients or dry, with water then being incorporated in a subsequent stage of the manufacturing process.

9 Claims, No Drawings

ISOTROPIC COMPOSITE CERAMIC WITH DISPERSED FIBERS AND PROCESS FOR MANUFACTURE THEREOF

This is a continuation of application Ser. No. 408,129, filed Oct, 16, 1973, now abandoned.

BACKGROUND OF THE INVENTION

The present invention concerns a type of composite ceramic article having fibres dispersed therein and a method for the manufacturing thereof.

The development of certain techniques using fluids brought to very high temperatures is conditioned to a certain extent by the availability of substances having very low heat conductivity combined with very high resistance to thermal shocks. It is known that these two properties are often incompatible. Ceramic substances have the advantage of having, as a general rule, low heat conductivity; on white the other hand, their resistance to thermal shocks is relatively slight.

It is also known that the thermal shock which a ceramic element having a determined shape can bear is proportional to the breaking strain S and that it is inversely proportional to the product of the coefficient of expansion $\alpha$ and Young's modulus E. To reduce Young's modulus greatly and thereby to increase the resistance to thermal shocks, it has been proposed to produce ceramic substances retaining a plastic state, but experience shows that the breaking strain S is thereby simultaneously reduced, thus making such a ceramic substance unfit for numerous uses and not improving its resistance to thermal shocks in a very marked way.

It is also known that mats of alumina fibre and zirconia fibre etc . . . , having, for the greater part, a direction of lay perpendicular to the surface of the said mat on which a ceramic substance has been moulded have been produced. Surfaces having very good resistance to thermal shocks combined with excellent mechanical qualities in a predetermined desired direction may thus be provided on request. This method does not enable producing parts having high isotropic mechanical resistance (in several directions) nor the casting of elements having complex shapes having simultaneously good resistance to thermal shocks and an improved mechanical strength in all directions. Now, numerous problems are presented where it would be desirable to be able to protect sensitive elements, intended to be placed in an aggressive medium brought suddenly to a high temperature, against heat and simultaneously against chemical action, while having improved mechanical qualities.

Experiments carried out by the inventors herein have shown that it is possible to produce isotropic ceramic substances having a low Young's modulus and being able to withstand consequently, high thermal shock, by incorporating therein various ceramic fibres dispersed in a cement substance. The improvement in the resistance to thermal shocks becomes particularly apparent when the percentage of ceramic fibres incorporated exceeds 20% of the total weight.

SUMMARY OF THE INVENTION

The object of the invention is therefore to provide a composite ceramic substance having fibres dispersed therein high characterized by resistance to thermal shocks and constituted of ceramic fibres dispersed in a hydraulic cement consisting of a calcium aluminate in a proportion greater than 20% of the total weight of the final product.

DETAILED DESCRIPTION OF THE INVENTION

Ceramic fibres are produced basically from several materials such as alumina, or zirconia or boron oxide. A ceramic fibre whose alumina content in the order of 88%, the remainder being formed of silica, $SiO_2$, is available on the market. Ceramic fibers may also generally be obtained having alumina contents of more than 85% and silica contents of less than 15%. Such fibres are incorporated in a hydraulic binding agent basically consisting of calcium aluminate in accordance with the process description given herebelow. An isotropic ceramic substance in which the Young's modulus E is at least 20 times lower than in known ceramic substances is thus obtained. The coefficient of expansion $\alpha$ decreases substantially whereas the breaking strain S remains constant, so that the resistance to thermal shocks is improved considerably.

Moreover, it should be noted that the resistance to corrosion of such a product remains, in a general way, very close to that of the hydraulic binding agent used. In the present case, where the incorporated fibre consists basically of alumina and where the hydraulic binding agent used is calcium aluminate, the same resistance to corrosion when hot found in ceramic substances basically consisting of alumina and calcium aluminate is retained.

The manufacturing method for these the composite isotropic ceramic substance having a hydraulic binding agent is characterised essentially in that it is necessary to add, when mixing the ingredients, a weight of water substantially of the order of the weight of the solid ingredients used with rapid stirring of mixture. Lower proportions of water are generally used. This characteristic is easily justified because the fibres must be distributed evenly in the mass without forming heterogenous nuclei and without becoming oriented in one direction.

The manufacturing method will be described below by example using a ceramic fibre made in industry, available under the name of FIBRAL and manufactured by Societe Generale des Products Refractaires (S.G.P.R.), whose alumina content is 88 % and whose $SiO_2$ content is 12 % with a tolerance of 1 to 4 % on alumina.

The above fibre is incorporated in a proportion greater than 20 % of the weight of the solid ingredients in a hydraulic cement formed by calcium aluminate. The mixture is made in a mixer of any known type, adding a weight of water at least equal to the weight of the cement. The mixture is made rapidly. Under these conditions, it is possible to incorporate fibre up to 80 % of the total weight, adding, on progressing, the required water. The mixture obtained is moulded, then vibrated. The water then rises to the surface. The excess water must be completely removed such as by mopping or wiping. When several successive operations have been carried out, it is indispensable to mop the product after each vibrating operation before adding a further quantity of freshly prepared mixture. The vibrating operations are stopped when the assembly assumes the consistency of a raw ceramic substance. It is then necessary to wait until hydraulic setting has taken place, this possibly requiring several hours.

Drying is then effected according to techniques known to the artisan using temperature stages according to the shapes and dimensions of the part.

Thus, for parts having a small diameter, it is possible to have the temperature rise for 20° C per hour and to have stages of 100° C and 300° C for a few hours.

For parts having large dimensions, the temperature must be made to rise more slowly. The inventors have obtained good results with a slope of 10° C per hour.

Baking is then effected at temperatures of 1000° C to 1300° C with the increase in temperature having the same slope as previously. The product obtained is a composite ceramic substance having a dispersed structure which is half fibrous - half cement, and having a Young's modulus in the order of 20 000 kg/squ. cm. instead of 500 000 kg/squ. cm. to 800 000 kg/squ. cm. a tensile strength in the order of 11 kg/squ. cm., a pressure-resisting force in the vicinity of 100 kg/squ. cm. and a coefficient of expansion decreased by about 25 % for a given temperature. On the other hand, it is observed that the coefficient of heat conductivity is very slight in the order of 0.2 to 0.4 w/m/° C. (Watts through unit thickness across unit area for unit difference of temperature).

A particularly remarkably quality of the product obtained is its negligible shrinkage when setting as well as when baking.

A ceramic substance having improved properties has been obtained by the same method, except using a fibre basically containing stabilised zerconia, comprising, for example, 98% zirconia stabilised with yttrium oxide, with calcium aluminate always fulfilling the function of a hydraulic binding agent.

The dispersion of the ceramic fibres in the hydraulic binding agent is promoted by incorporating a great proportion of water. Nevertheless, dispersion of the ceramic fibres has also been obtained in the dry state in excellent condition by dry mixing the hydraulic binding agent with the ceramic fibre, in a Y-shaped mixer, for example. Water is then incorporated in a subsequent stage.

The ceramic substance of the present invention may be used in the manufacturing of ceramic parts to be moulded around magnetic circuits of immersed electromagnetic pumps. Assemblies are needed to withstand thermal shocks when the pump is lowered into a liquid metal bath kept at a high temperature, for example, when handling or treating aluminum. Pumps thus protected by the ceramic of this invention resist thermal shocks on cooling as well.

The ceramic can be used to great advantage in the manufacturing of moulds in an aluminum foundry because of the complete absence of shrinking and expansion of the ceramic substance during manufacturing of the mould.

It was also possible to use the invention to produce moulds of all types, tubes, refractory bricks, liquid metal casting spouts, and also linings for furnaces, melting ladles, outlet ducts for very hot liquids or gases which are particularly reactive.

The uses described above appear to afford the greatest advantage for implementing the invention directed to the manufacturing of a mixed ceramic substance containing a dispersion of ceramic fibre which is available on the market. It will be understood that various modifications may be made to the invention without going beyond the scope of the invention.

We claim:

1. A composite isotropic ceramic article for use in aluminum foundry having excellent long-term resistance to molten aluminum thermal shock consisting of 20% to 80% by weight of ceramic fibers consisting of more than 85% alumina and less than 15% silica, and 80% to 20% of calcium aluminate hydraulic binding agent, said ceramic fibers being dispersed in said hydraulic bindng agent.

2. The article of claim 1, wherein said dispersed ceramic fibers consist of more than 88% of alumina and less than 12% of silica.

3. The article of claim 1, wherein the Young's modulus of said article is about 20,000 kg/cm$^2$.

4. The article of claim 1, wherein the coefficient of heat conductivity of said article is about 0.2 to 0.4 w/m/° C.

5. A composite isotropic ceramic article for use in aluminum foundry having excellent long-term resistance to thermal shock consisting of 20% to 80% by weight of ceramic fibers, and 80% to 20% by weight of calcium aluminate hydraulic binding agent, said ceramic fibers consisting of more than 98% of zirconia, and stabilized with yttrium oxide.

6. A method for manufacturing composite isotropic ceramic substances characterized by excellent resistance to thermal shock and consisting of 20% to 80% by weight of ceramic fibers dispersed in calcium aluminate hydraulic binding agent; said method comprising dispersing the ceramic fibers within the hydraulic binding agent in the presence of a weight of water of the order of the weight of the solid ingredients present, rapidly mixing the mixture thus obtained, placing the mixture in a mould, allowing hydraulic setting to take place in the mould, drying the mixture, and finally baking the mixture at a temperature of 1000° C to 1300° C to form said isotropic ceramic article.

7. The method of claim 6 wherein after the ceramic fibers have been dispersed within the hydraulic binding agent in the presence of a weight of water at least equal to the weight of the solid ingredients, vibrating the product obtained and removing excess water therefrom.

8. A method for manufacturing composite isotropic ceramic substances characterized by excellent resistance to thermal shock, consisting of 20% to 80% by weight of ceramic fibers and 80% to 20% by weight of calcium aluminate; said method consisting of incorporating said ceramic fibers dry into the calcium aluminate, adding thereafter water to the ceramic fibers and calcium aluminate in a weight of the order of the weight of the cement present, allowing hydraulic setting to take place in a mould, drying the mixture, and finally baking the mixture at a temperature of 1000° C to 1300° C to form said composite isotropic ceramic article.

9. A method for manufacturing composite isotropic ceramic substances characterized by excellent resistance to thermal shock and consisting of 20% to 80% by weight of ceramic fibers dispersed in calcium aluminate hydraulic binding agent in the presence of a weight of water of the order of the weight of the hydraulic binding agent present, rapidly mixing the mixture thus obtained, placing the mixture in a mould, allowing hydraulic setting to take place in the mould, drying the mixture, and finally baking the mixture at a temperature of 1000° C to 1300° C to form said isotropic ceramic article.

* * * * *